United States Patent [19]
McNally

[11] Patent Number: 6,113,382
[45] Date of Patent: Sep. 5, 2000

[54] PRESS WITH SWINGABLE TOP PRESS PLATE

[75] Inventor: Douglas J. McNally, Chatham, Canada

[73] Assignee: Konal Engineering and Equipment Inc., Blenheim, Canada

[21] Appl. No.: 09/039,920

[22] Filed: Mar. 16, 1998

[51] Int. Cl.[7] .............................. B29C 33/26; B29C 45/64
[52] U.S. Cl. ..................... 425/589; 425/405.1; 425/409; 425/450.1; 425/451.7; 425/453
[58] Field of Search ..................................... 425/589, 592, 425/595, 450.1, 451.5, 451.7, 451.9, 405.1, 409, 453, 454, 576

[56] References Cited

U.S. PATENT DOCUMENTS

| | | | |
|---|---|---|---|
| 3,691,266 | 9/1972 | Greenberg | 425/451.9 |
| 3,981,671 | 9/1976 | Edwards | 425/450.1 |
| 4,245,971 | 1/1981 | MacMillan | 425/451.9 |
| 4,708,625 | 11/1987 | Arend | 425/589 |
| 5,033,955 | 7/1991 | Faig et al. | 425/589 |
| 5,282,732 | 2/1994 | Eggert | 425/451.7 |
| 5,395,232 | 3/1995 | Hori | 425/589 |
| 5,919,494 | 7/1999 | Swenson | 425/450.1 |

*Primary Examiner*—James P. Mackey
*Attorney, Agent, or Firm*—Flynn, Thiel, Boutell & Tanis, P.C.

[57] ABSTRACT

A mold press for an electric drive arrangement for controlling opening and closing press movement. The drive arrangement includes a pair of generally identical drive units connected between upper and lower press plates. The drive units in a preferred embodiment each employ a ball-screw arrangement. A screw shaft extends vertically of the press, and engages a ball nut assembly which is mounted on the top press plate for effecting movement thereof toward and away from the bottom press plate. An electric motor is coupled to the screw shafts for effecting high speed opening and closing movement of the top press plate. A force apply device, such as an inflatable hose or bladder, is associated with the bottom press plate to effect application of the desired press closing force. A control linkage is connected between the top press plate and the frame for effecting automatic sideward swinging of the top press plate between a side access position when the plate is in its fully opened position, and an operational position wherein the top press plate is disposed vertically aligned above but spaced upwardly from the lower press plate. The swinging movement of the top press plate between these two positions is effected automatically in response to vertical displacement of the top press plate by the main drive unit during an upper portion of the normal opening and closing movement of the top press plate. This control linkage, in a preferred embodiment, comprises a self-contained extendible spring device such as an air spring which effectively assumes a minimum height position when the top press plate is intermediate its stroke so as to induce sideward swinging of the top press plate during the upper portion of the stroke.

13 Claims, 9 Drawing Sheets

PRESS WITH SWINGABLE TOP PRESS PLATE

FIELD OF THE INVENTION

This invention relates to a press system for forming plastic parts, such as urethane parts, and more particularly to an improved press which is preferably defined on a self-propelled carrier associated with and suspended from an overhead transport system and which includes an improved drive arrangement for effecting opening and closing of the top press plate.

BACKGROUND OF THE INVENTION

It is conventional to form components which are partially or totally of plastic, particularly large components such as vehicle door panels and the like, in a mold press (commonly referred to as a "rim" press) with the part being formed in a mold cavity defined between relatively movable upper and lower mold parts. For forming a component such as a vehicle door panel, various techniques can be utilized. For example, a vinyl sheet which can be heated and vacuumed formed, and possibly in conjunction with a fiberglass sheet, can be positioned in the mold cavity and polyurethane deposited into the cavity to permit molding of the desired component within the press. In some circumstances the vinyl is premolded or preshaped, or in other circumstances the molded component is formed without a vinyl layer.

The conventional mold presses for forming such components are often mounted on a turntable which indexes through a plurality of stations formed along a circular work path. While this arrangement does provide convenience with respect to efficient movement of multiple presses into and through spaced workstations, nevertheless such turntable arrangement typically permits access to the press and specifically to the upper and lower mold parts only from one side, and this greatly hinders and restricts the desired access to the press since workers must access the press so as to not only insert whatever premold parts and components are necessary, but also to assist in removal of the molded part.

As an alternative, many of the known mold presses are freestanding units. This increases worker access by typically permitting access to the press at least from opposite sides thereof. Nevertheless, the overall molding process associated with a single press involves several stages and hence requires significant time, and thus efficient use of workers accordingly normally requires that the workers move back and forth so as to permit servicing of several adjacent freestanding presses. Such arrangement is less efficient than desired, and more fatiguing for workers.

With the known mold presses, as briefly discussed above, the opening and closing movement of the press, as well as the press closure force, is typically controlled by fluid pressure cylinders, normally hydraulic cylinders. Such press arrangements, however, are generally energy inefficient since the use of hydraulic cylinders as the energizing source, and the overall support equipment necessary to provide and supply pressurized hydraulic fluid to the press cylinders, results in significant energy loss in relationship to the electrical energy which is supplied so as to effect operation of the press fluid system. In addition, presses employing hydraulic cylinders for creating the moving and pressing function of the press have also demonstrated an undesirable noise level associated with the fluid cylinder system. Such systems also typically experience leakage of hydraulic fluid, which can create an undesired and sometimes potentially hazardous condition around the press. The hydraulic systems also generate significant and often undesired heat.

In addition, in many of the known mold presses which utilize a movable top platen, the opening and closing movement of the top platen not only typically involves use of hydraulic cylinders, but in addition also typically requires additional complex driving structure, such as an additional driving cylinder, to effect sideward swinging movement of the top platen when in its open position so as to facilitate worker access thereto. The overall drive arrangement for the top platen involves undesired mass and complexity, as well as controls for coordinating the different drives and the different movements provided thereby.

Accordingly, it is an object of this invention to provide an improved mold press which is believed to overcome many of the disadvantages and inconveniences associated with known mold presses, as briefly summarized above, and which is believed to provide for improved efficiency of operation, improved energy efficiency, and improved convenience of access and use.

More specifically, the improved mold press of this invention includes an electric drive arrangement for controlling opening and closing press movement so as to eliminate the use of hydraulic cylinders, whereby the overall energy efficiency of the press is significantly improved, and at the same time, heat generation and oil leakage problems associated with conventional hydraulic cylinder presses are eliminated. The improved mold press and specifically the drive arrangement includes a pair of generally identical drive units connected between the upper and lower press plates. The drive units in a preferred embodiment each employ a ball-screw arrangement. A screw shaft extends vertically of the press, and engages a ball nut assembly which is mounted on the top press plate for effecting movement thereof toward and away from the bottom press plate. An electric motor is coupled to the screw shafts for effecting high speed opening and closing movement of the top press plate. A force apply device, such as an inflatable hose or bladder, is associated with the bottom press plate to effect application of the desired press closing force. A control linkage is connected between the top press plate and the frame for effecting automatic sideward swinging of the top press plate between a side access position when the plate is in its fully opened position, and an operational position wherein the top press plate is disposed vertically aligned above but spaced upwardly from the lower press plate. The swinging movement of the top press plate between these two positions is effected automatically in response to vertical displacement of the top press plate by the main drive unit during an upper portion of the normal opening and closing movement of the top press plate. This control linkage, in a preferred embodiment, comprises a self-contained extendible spring device such as an air spring which effectively assumes a minimum height position when the top press plate is intermediate its stroke so as to induce sideward swinging of the top press plate during the upper portion of the stroke.

In the improved mold press of this invention, as aforesaid, the upper press plate is carried on an upper press platen by a generally horizontally extending pivot which permits sideward vertical swinging of the upper press plate between an operational position wherein it extends generally horizontally and is disposed vertically above the lower press plate, and a sideward access position wherein it is vertically angled so as to project sidewardly to facilitate access by a worker. The upper press platen in turn is vertically slidably supported on the press frame for movement between upper and lower positions which generally correspond to the upper and closed positions of the press. The drive unit and specifically the ball-screw units are connected between the frame and the upper press platen to control movement of the latter. The control linkage is connected between the frame and the upper press plate. When the upper platen is at or below an intermediate position, the control linkage maintains the upper press plate in its operational position so as to permit proper operative positional relationship with the lower press platen. When the upper press platen is being moved vertically between the upper and intermediate positions, however, either during opening or closing of the press, the control linkage is effectively in a solid or non-contractile condition and causes the upper press plate to vertically swing sidewardly into an access position if the upper press platen is being moved upwardly, or conversely causes the upper press platen to be vertically swung sidewardly from the access position to the operational position if the upper press platen is being moved downwardly.

In the improved press of this invention, as aforesaid, the control linkage preferably is formed as a spring unit so that, during movement of the upper press platen between the intermediate position and the lowered (i.e., press closure) position, the spring exerts an upward force on the upper press platen and hence on the upper press plate so as to effectively assist in counterbalancing the weight of the upper press platen during the closing movement, and to create an additive upward force to assist the drive motor during the upward opening movement, the latter being particularly significant with respect to increasing the force which is available to effect initial separation of the upper mold part from the lower mold part.

In accordance with the present invention, as aforesaid, the mold press is preferably mounted on a self-propelled overhead carrier associated with and driven along an overhead rail system so that the mold press is suspended from the carrier and free of direct support from the underlying floor. The overall system preferably includes a plurality of carriers each mounting thereon a mold press, with the carriers being sequentially moved through a plurality of spaced stations along the overhead track, the latter preferably defining a loop, to facilitate efficient use of the presses by permitting various functions to be carried out at spaced workstations, with the presses being efficiently transferred between workstations, and with the actual molding operation being carried out either as the carrier is transferred between workstations or is shuttled into an intermediate holding zone for sufficient duration to permit the desired molding of the component. With the mold press mounted on a driven overhead carrier, the press provides improved access to the mold parts by workers.

Other objects and purposes of the invention will be apparent to persons familiar with assemblies of this general type upon reading the following specification and inspecting the accompanying drawings.

Figure 1:
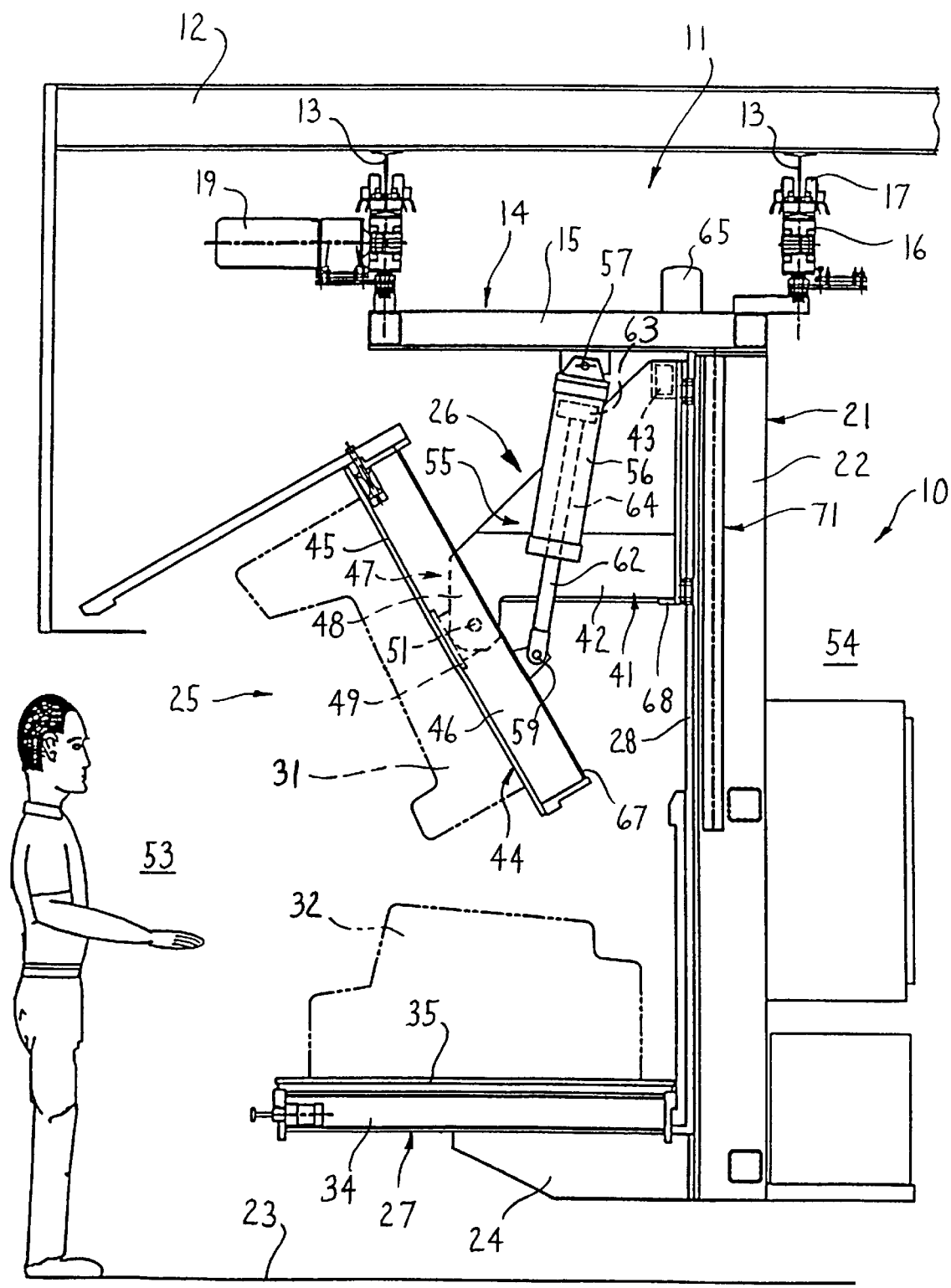
FIG. 1 is a side elevational view which illustrates the improved press of the present invention, the press being illustrated in its uppermost and fully open position.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the press unit and designated parts thereof. Said terminology will include the words specifically mentioned, derivatives thereof, and words of similar import.

DETAILED DESCRIPTION

Referring to the drawings and specifically FIGS. 1–4, there is illustrated a molding system 10 according to the present invention. The molding system 10 includes a plurality of self-propelled carriers, only one carrier 11 being illustrated in FIGS. 1–4, supported in suspended relation from an overhead rail system 12. The rail system 12 is typically positioned in upwardly spaced relation from the floor, such as adjacent a ceiling, and in the illustrated embodiment includes a pair of generally parallel and horizontally extending rails or beams 13 from which individual carriers 11 are suspended. The rails 13 are typically formed to define a closed loop so that the carriers can be moved along a closed path into a plurality of workstations defined along the path.

The carrier 11 includes a generally rigid frame 14 which defines a top frame structure 15 disposed downwardly below and extending transversely between the pair of overhead rails 13. The top frame structure 15 mounts thereon a plurality of upwardly projecting cradles or yokes 16, with at least two said yokes preferably being disposed adjacent each side of the frame adjacent front and trailing ends thereof. Each cradle 16 in turn mounts thereon a plurality of rollers 17 which effectively rollingly engage the upper surface of the bottom flange of the respectively adjacent support rail 13. The support rail 13 in the illustrated and preferred embodiment is formed generally as an I-shaped beam so that the rollers 17 effectively straddle the I-beam and rollingly engage the lower flange thereof on opposite sides of the vertical web of the I-beam.

The top frame structure 15 also supports thereon at least one drive arrangement for the carrier, and in the illustrated embodiment a pair of drive rollers (not shown) are rotatably supported adjacent one side of the carrier and are disposed on opposite sides of one of the I-beam rails 13 so as to maintain the web of the I-beam engaged therebetween. A suitable electrical drive motor 19 is interconnected to one or both of the drive rollers to effect driving engagement with the support rail 13 when movement of the carrier 11 along the overhead rails is desired. It will be appreciated that additional driving roller arrangements can be provided if necessary or desired.

The suspension of a carrier 11 from an overhead rail arrangement, and the driving movement of the carrier along the overhead rails by means of a motorized drive roller arrangement mounted on the carrier, is conventional and further detailed description thereof is believed unnecessary.

The frame 14 of the carrier 11 also includes a side frame 21 which is disposed adjacent one side of the carrier, with the side frame 21 being rigidly fixed to the top frame structure 15 adjacent one side thereof. The side frame 21 is cantilevered vertically downwardly from the top frame, and includes a pair of vertically elongate and substantially parallel support posts 22 which are disposed in front-to-back spaced relation relative to the longitudinal direction of movement of the carrier. The lower end of the side frame 21 is disposed adjacent but spaced upwardly a small distance from the floor 23. A bottom frame structure 24 is rigidly joined to the lower end of side frame 21 and is cantilevered horizontally therefrom so as to be disposed under the top frame structure 15.

The frame 14 supports thereon a press 25 (i.e., a rim press) for forming parts which are at least partially molded of a plastics material such as polyurethane. The parts are typically rather large in size and may comprise parts such as interior door panels for vehicles and the like. The press 25 as provided on the carrier 11 includes a lower press structure 27 which is fixedly related to the frame 14, and an upper press structure 26 which is vertically movably supported on the frame 14 for movement between the top and bottom frame structures 15 and 24. The upper press structure 26 is vertically slidably guided on guides or ribs 28 which are fixed to and project vertically along the frame posts 22.

Figure 2:
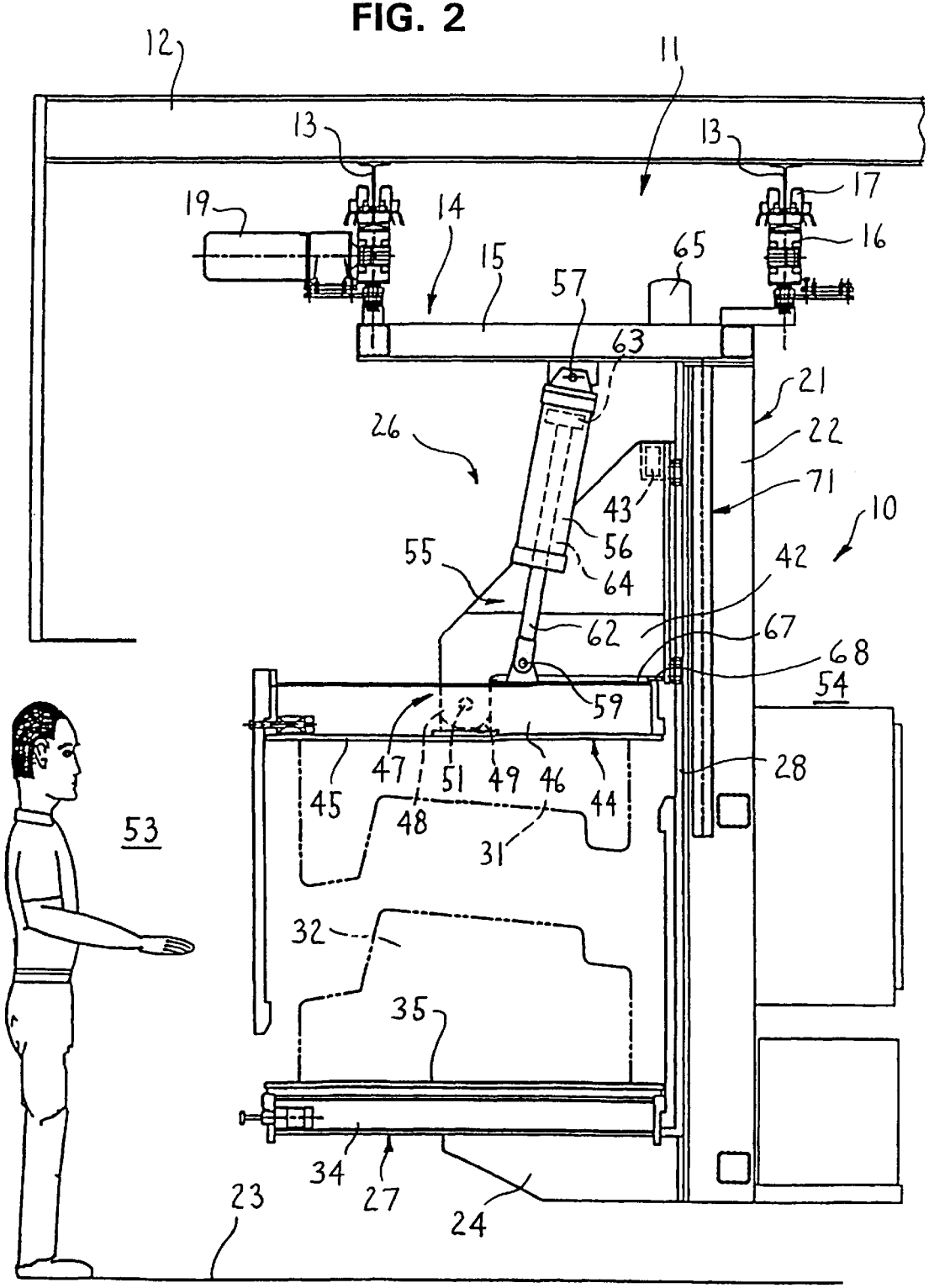
FIG. 2 is a side elevational view similar to FIG. 1 and illustrating the upper platen of the press in an intermediate position.
Figure 3:
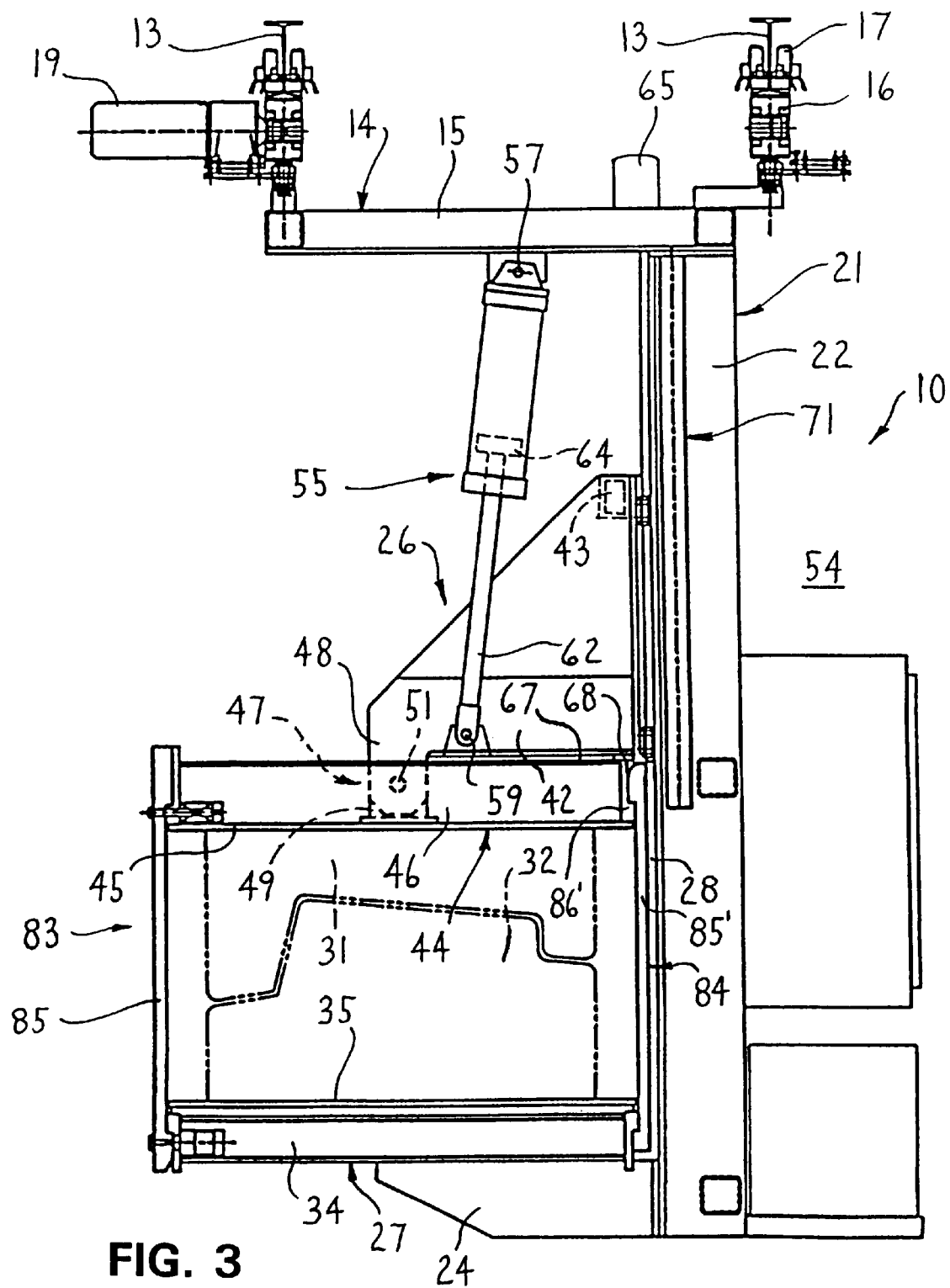
FIG. 3 is a side elevational view similar to FIG. 1 but showing the press in its fully closed position.

The press 25 is adapted to support thereon a mold which typically includes a top mold part 31 which is supported on and projects downwardly from the upper press structure 26, and a bottom mold part 32 which is fixedly supported on and projects upwardly from the bottom press structure 27. The top and bottom mold parts 31 and 32 are disposed generally in vertically aligned relation when in the operational position shown in FIG. 2, and they respectively define therein opposed mold cavity portions (not shown) which cooperate to define a mold cavity for forming the desired part when the upper mold part 31 has been moved down into a closed engaged relation with the upper mold part 32 as shown in FIG. 3. The construction of the mold parts 31 and 32 is conventional, is designed in accordance with the specific part being formed, and further detailed description thereof is believed unnecessary.

Figure 6:
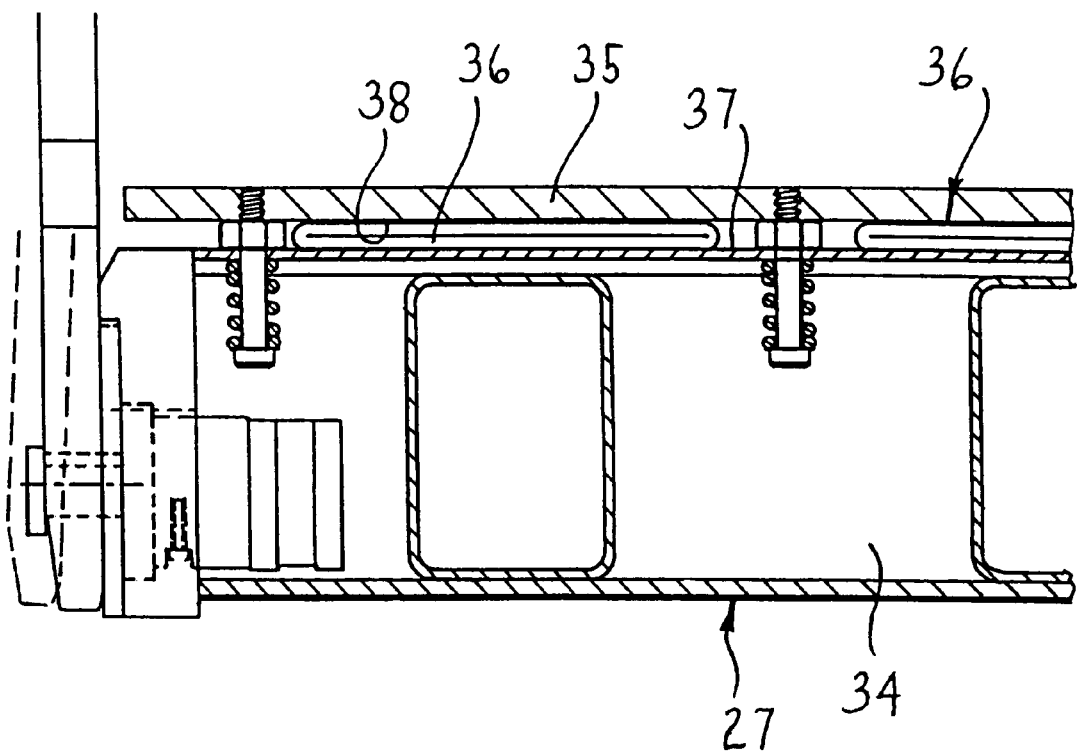
FIG. 6 is a fragmentary enlarged view which illustrates the latch engaged.

As to the bottom press structure 27, it includes a horizontally enlarged bottom support or platen 34 which is fixedly supported on the lower frame structure 24 so as to horizontally project sidewardly in cantilevered relation with respect to the upright side frame 21. This bottom platen 34 in turn supports thereon a horizontally enlarged bottom press plate 35, which press plate 35 on its upper surface has the bottom mold part 32 fixed thereto. The bottom press plate 35 is supported on the bottom platen 34 in such manner as to permit small vertical movement of the press plate 35, and for this purpose the plate 35 is mounted on the platen 34 by a plurality of support pin-and-spring arrangements as shown in FIG. 6. A force applying device 36 (FIG. 6) also cooperates between the bottom platen 34 and the bottom press plate 35. This force applying device 36, in the illustrated embodiment, comprises one or more inflatable hoses or bladders which extend beneath the bottom press plate 35 and are disposed for coaction between the undersurface 38 of the bottom press plate and a top surface 37 on the bottom support platen. The supply of pressurized air to the hose or bladder 36 imposes an upward force on the bottom press plate 35, and can cause slight upward lifting of the bottom press plate if necessary to ensure proper closure between the upper and lower mold parts, whereby the air hose or bladder imposes the desired closure force on the mold.

The general construction of the bottom press structure 27, and specifically the provision of an inflatable air hose for generating a closure force on the bottom press plate, is conventional so that further detailed description thereof is believed unnecessary.

Considering now the upper press structure 26, same includes a top support or platen 41 which is vertically slidably supported on the vertical frame posts 22. The top platen 41, in the illustrated embodiment, is defined by a pair of generally parallel support arms 42 which are respectively positioned adjacent and project horizontally in cantilevered relation away from the vertical frame posts 22. These support arms 42 which, at the ends thereof adjacent the frame posts 22, are rigidly joined together by top and bottom horizontally extending bridging members 43, only the top bridging member 43 being shown in the drawings for purposes of illustration.

The top press structure 26 also includes an upper press plate assembly 44 which is carried by the top platen 41 for movement therewith. This upper press plate assembly 44 includes a generally horizontally enlarged upper press plate 45, the latter having an enlarged bottom surface on which the top mold part 31 is mounted so as to project downwardly in opposed relation to the lower mold part 32. The upper press plate 45 is fixedly secured to a plate support frame 46 which is disposed adjacent and projects upwardly from the press plate 45. A pivot arrangement 47 connects the upper press plate assembly 44 to the top platen 41.

The pivot arrangement 47 includes a yoke structure 48 which is defined at and projects downwardly from the outer free ends of the support arms 42, which yoke 48 straddles a channel member 49 which is fixed to the upper press plate assembly 44. The yoke 48 and channel member 49 are joined by a generally horizontally extending hinge pin 51, the latter defining a horizontally extending hinge axis 52 which extends generally parallel with the side frame 21 so as to extend in the direction of movement of the carrier 11. The hinge arrangement 47 is provided at two axially aligned and spaced locations so that a suitable hinge support exists adjacent the free end of each of the two support arms 42.

The hinge 51, as illustrated in the drawings, is preferably positioned vertically in close proximity to the upper press plate 45, being spaced upwardly therefrom by a small distance in the illustrated embodiment. Further, the hinge axis 52 is preferably disposed centrally, approximately midway, between the opposite sides of the upper press plate assembly, namely the respective left and right sides 53 and 54 as indicated in FIGS. 1–3. The left side 53 is the side of the press which will be closest to the worker so as to provide access to the mold parts, and is often referenced as the "front" or "access" side of the press. Similarly, the other or right side 54 is often referred to as the rear or remote side of the press.

To effect tilting of the top press plate assembly 44 into a sidewardly oriented access position as illustrated in FIG. 3, a tilt control linkage 55 is coupled between the frame 14 and the upper press plate assembly 44. This control linkage 55, in the illustrated embodiment, comprises an elongate extendible spring unit 56 which is oriented approximately vertically and has its upper end connected to the top frame 14 by an upper horizontal hinge arrangement 57, the latter defining a generally horizontally extending hinge axis which extends parallel to the hinge axis 52. The lower end of the tilt control linkage 55 is similarly connected to the upper press plate assembly 44 by a lower horizontal hinge arrangement 59, the latter defining a further horizontally extending hinge axis which extends parallel with the hinges 51 and 57.

In the illustrated and preferred embodiment, the spring unit 56 comprises a gas spring which includes an elongate cylinder housing 62 having its upper end joined to the frame by the upper horizontal hinge 57. An elongate piston rod 62 slidably projects coaxially outwardly of the lower end of the cylinder housing and is joined to the upper press plate assembly 44 by the lower horizontal hinge 59. The piston rod 62 at its upper end is joined to a conventional piston 63 which is slidably disposed within the interior of the housing 61. A pressure chamber 64 is defined within the housing 61 below the piston 63. This pressure chamber 64 in turn communicates through a suitable passage or hose (not shown) with a conventional pressure accumulator 65 which is stationarily mounted on the carrier 11, such as adjacent the top frame structure 15. This accumulator 65 contains a quantity of pressurized gas (i.e., air) which is maintained in continuous communication with the gas contained in the pressure chamber 64, with the accumulator maintaining an approximately constant or uniform pressure while enabling the pressurized gas to flow to or from the pressure chamber 64. Such pressure accumulators are conventional.

When the upper press plate assembly 44 is at or below the intermediate operational position illustrated in FIG. 2, the extendible spring unit 56 imposes an upwardly directed force on the upper press plate assembly 44 so that the latter is always urged counterclockwise about the pivot 51 so that the rear upper edge 67 of the assembly 44, which rear upper edge functions as a stop, is maintained in abutting contact with a stop 68 which is fixed to the underside of the support arms 42 in close proximity to the frame posts 22. This cooperation between the opposed stops 67–68 maintains the upper press plate assembly 44 in an operational horizontal orientation so that the upper mold part 31 is disposed in cooperative alignment with the lower mold part 32. In addition, when the upper press structure 26 is at an elevation corresponding to the operational position of FIG. 2, the spring unit 56 is effectively in its fully contracted condition, such as due to the interior piston 63 being disposed in abutting engagement with an interior stop defined within the cylinder housing. Accordingly, any movement of the top platen 44 upwardly away from this intermediate operational position causes the upper press plate assembly 44 to pivot sidewardly about the pivot 51 towards the access position of FIG. 1 as explained hereinafter.

To provide for opening and closing of the press and specifically the opening and closing movement of the upper press structure 26, the press of this invention includes a pair of substantially identical screw-type drive units 71, preferably ball-screw drive units, which drive units are disposed adjacent the side of the press where it cooperates with the side frame 21. These screw drive units are disposed in generally parallel and vertically extending relation, being spaced apart generally along the direction of movement of the carrier, with the drive units being drivingly connected between the frame 14 and the top press structure 26.

Figure 7:
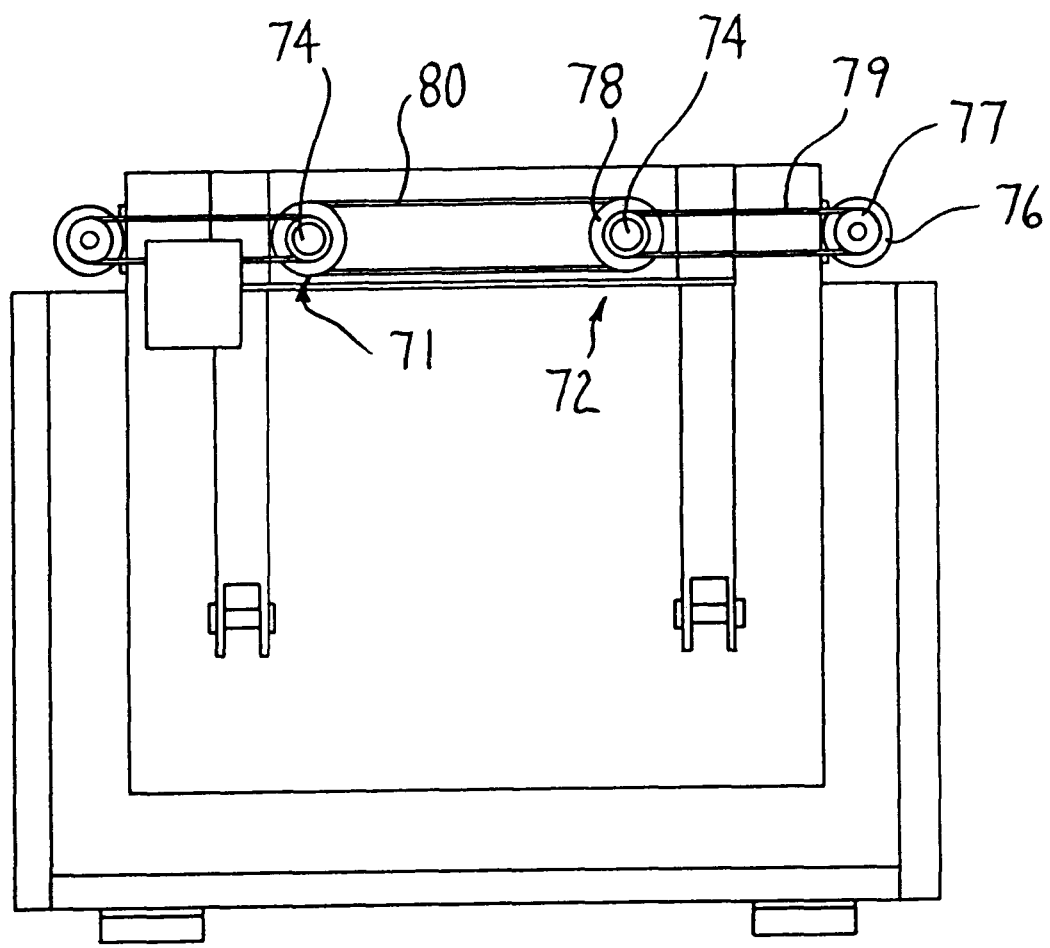
FIG. 7 is a diagrammatic top view which illustrates the driving arrangement for the drive screws which control movement of the upper platen structure.
Figure 8:
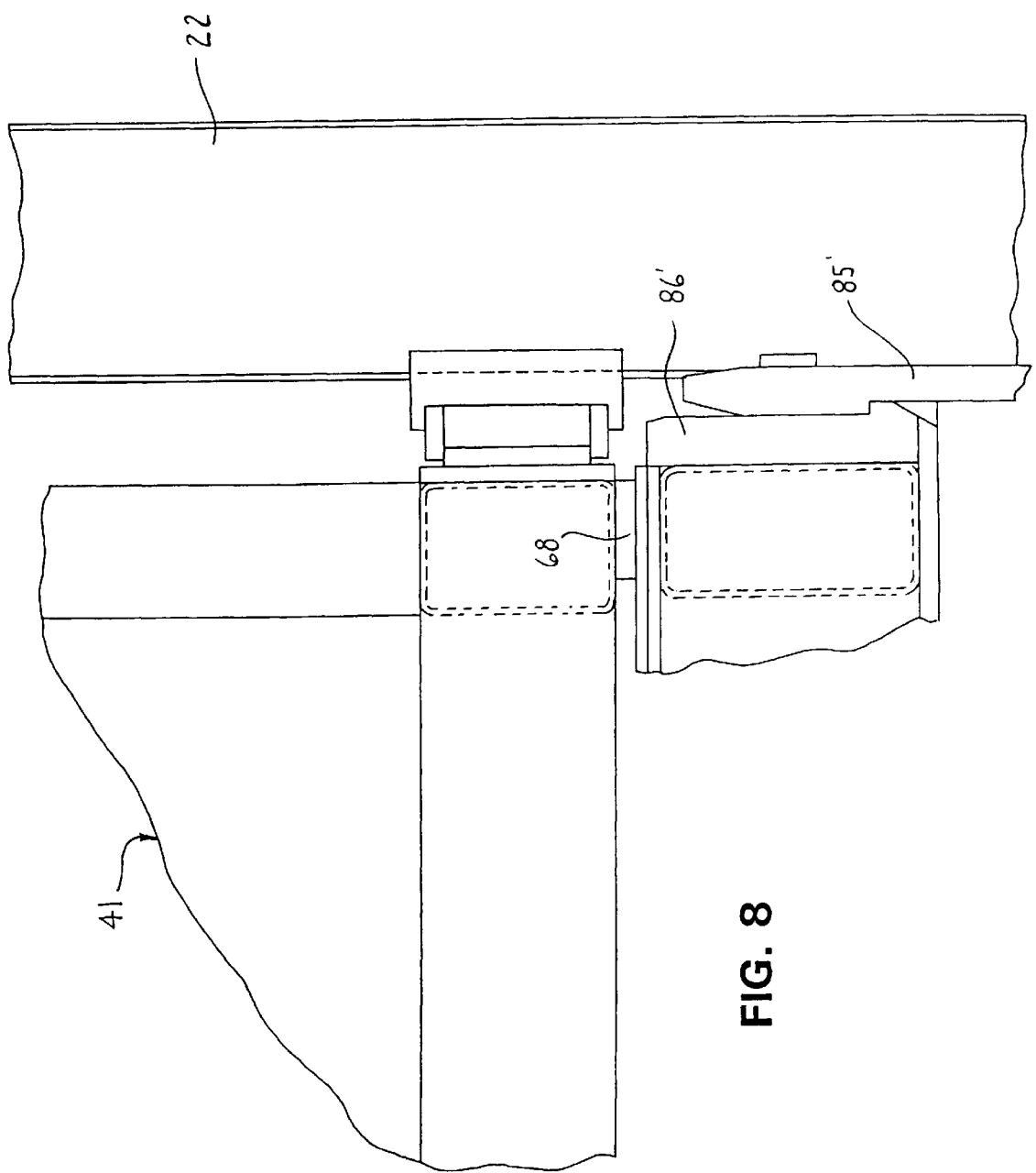
FIG. 8 is a fragmentary enlarged view showing the upper platen slidably mounted on the upright positions, and showing the rear-side latch.

The two screw drive units 71 are in turn synchronously rotatably driven by a powered drive arrangement 72 (FIG. 7) which is mounted on the top frame structure 15, as described below.

Figure 9:
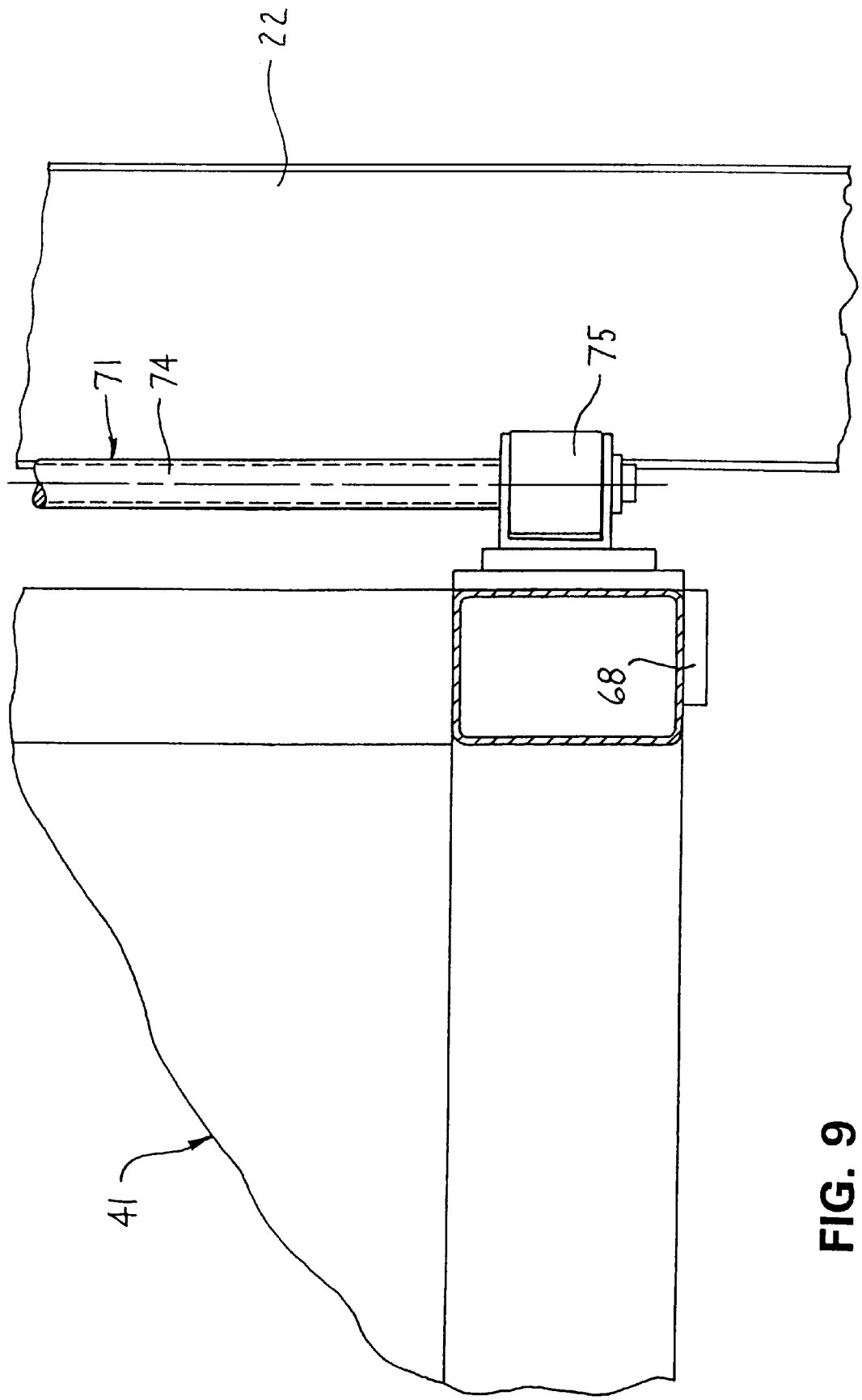
FIG. 9 is a view similar to FIG. 8 but showing the connection of the ball nut between the upper platen and the screw shaft.

Each screw drive unit 71 includes a generally vertically elongate drive shaft 73 which is rotatable about a generally longitudinally extending vertical axis, with the upper and lower ends of the drive shaft being suitably rotatably supported on the frame by appropriate bearings. The elongate intermediate portion of the screw shaft 74 is appropriately threaded for cooperation with a conventional recirculating ball-type nut 75 (FIG. 9), the latter being disposed in surrounding engaged relation with the screw shaft and nonrotatably mounted on the top platen 41 in the vicinity of the rightward side edge thereof.

The drive arrangement 72 (FIG. 7) for the screw drive units 71 includes a reversible electric drive motor 76, which is mounted on the top frame and has a drive pulley 77 associated therewith, the latter being drivingly engaged with a shaft pulley 78 fixed to the upper end of the drive shaft 74 through an appropriate drive belt 79. In the illustrated and preferred embodiment, each of the screw shafts 74 is driven from its own respective electric motor 75, and the two screw shafts 74 have additional pulley secured thereto and engaged with a timing belt 80 so as to provide synchronization of the two independently driven screw shafts. The timing belt also ensures that both screw shafts can be properly rotatably controlled in the event of a failure of one of the motors 75.

Figure 4:
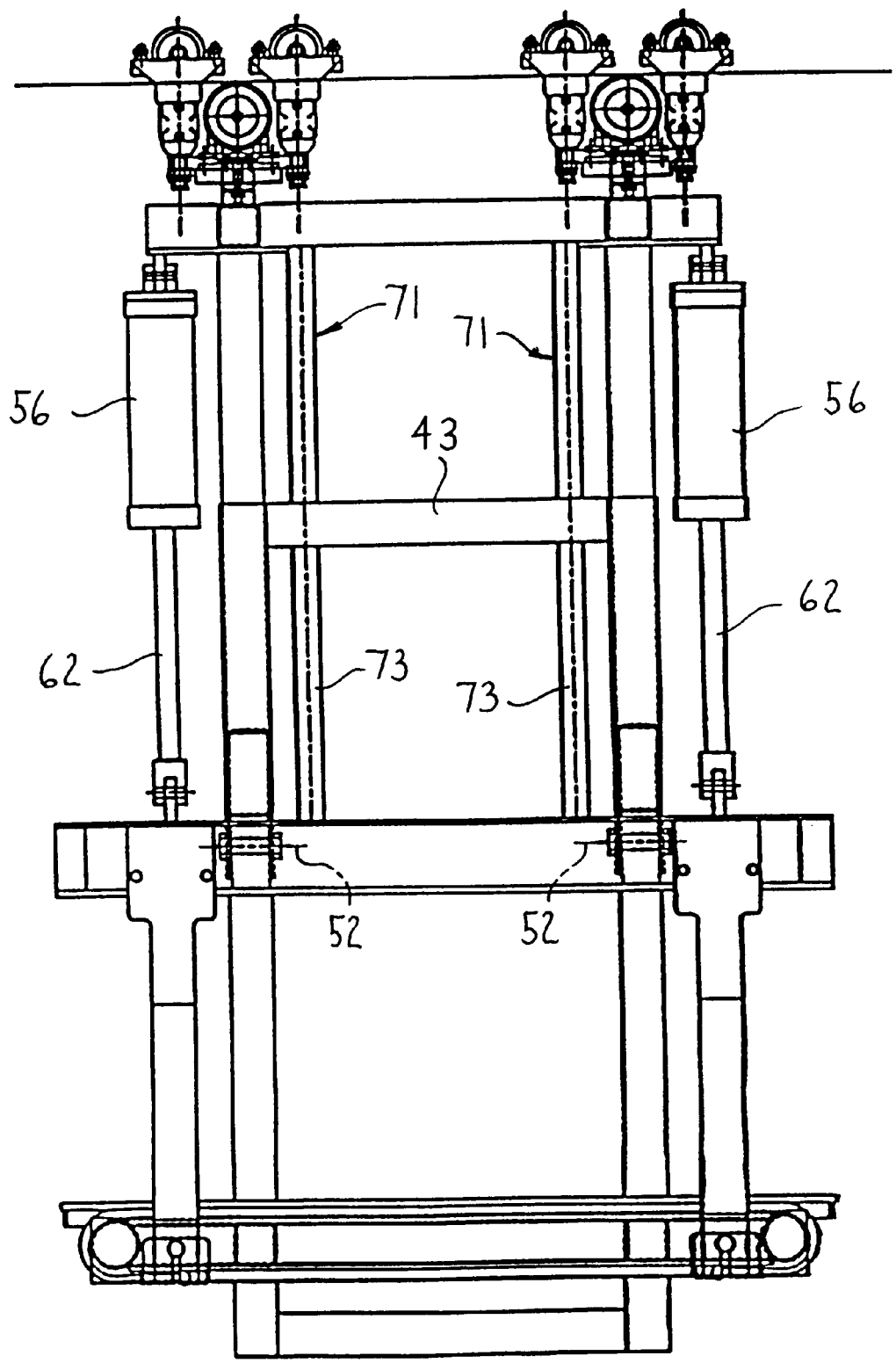
FIG. 4 is an elevational view showing the front side of the press when in the closed position of FIG. 3.
Figure 5:
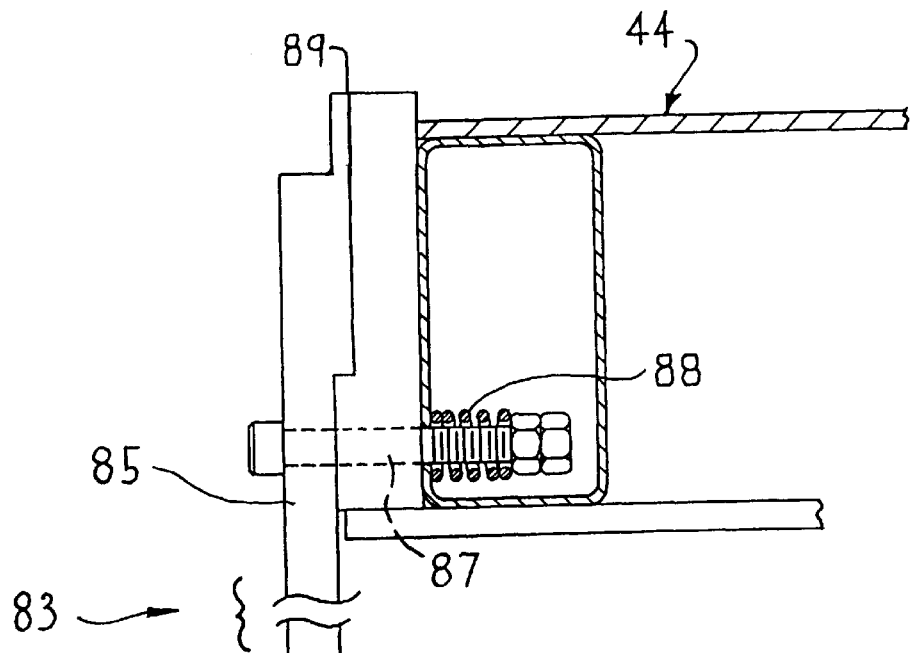
FIG. 5 is a fragmentary enlarged view which illustrates a latch arrangement which cooperates between the upper and lower platens.
Figure 5:
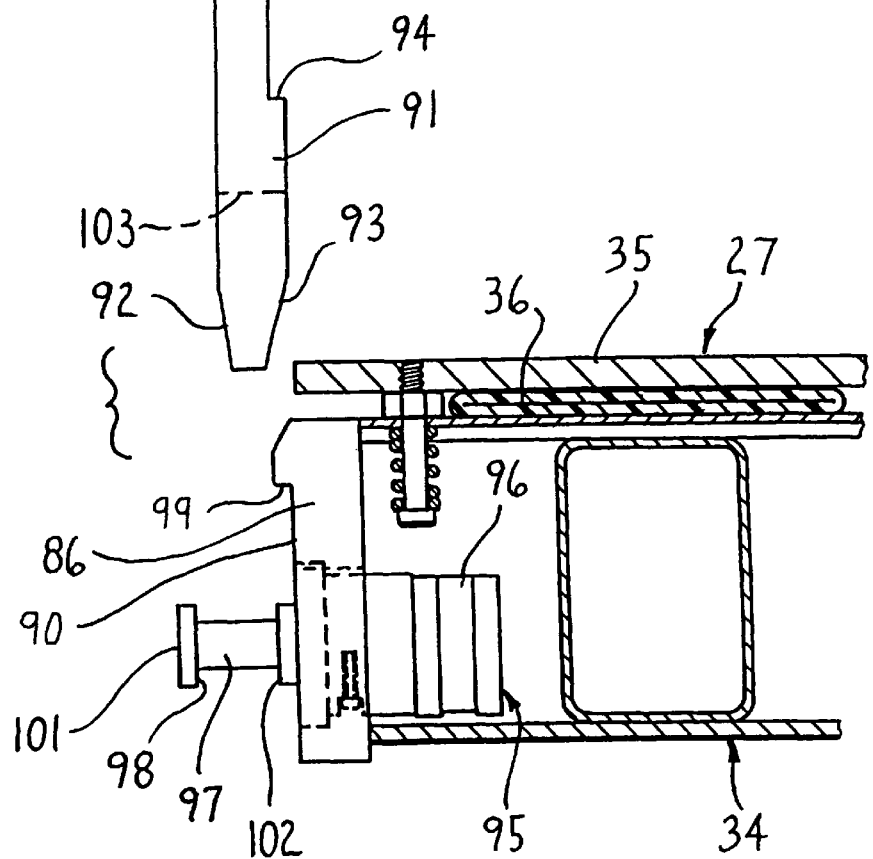

To ensure proper securement of the mold when the press is in a closed position, the press includes latching structure which cooperates between the upper and lower press structures 26 and 27 when in the closed position of FIGS. 3–4. This latching structure includes latching units disposed on opposite sides of the press, namely left and right latching units 83 and 84 respectively. A pair of substantially identical left latch units 83 are disposed on the access side of the press in spaced relationship therealong, and a pair of identical left latch units 84 are disposed on the opposite or remote side of the press in spaced relation therealong, whereby the pairs of right and left latches are disposed in the general vicinity of the four corners of the press.

Each left latch unit 83 includes a latch member 85 which is mounted on the upper press plate assembly 44 and which cooperates with a latch part 86 mounted on the lower pres structure 27. The latch member 85 is an elongate fingerlike member which has its upper end mounted to the upper press plate structure 44 by pins or bolts 87 and springs 88, with this latch member 85 being generally vertically cantilevered downwardly toward the bottom press plate when the press is in the positions illustrated by FIGS. 2 and 3. The pins 87 and springs 88 enable the latch 85 to vertically swing outwardly about the upper corner 89 which functions as a hinge axis.

The latch member 85 at its lower free end is provided with an enlarged latching head 91. This head 91 on the lower inner and outer corners thereof is provided with tapered cam surfaces 92 and 93 to facilitate its latching engagement, as described below. This latching head 91, on the upper end thereof, defines a generally horizontally extending latch shoulder 94.

As to the construction of the latch part 86, it is fixedly secured to the bottom press platen 34 adjacent one the side thereof, and is formed as a generally inverted L-shaped plate or member. This latch part 86 defines a sidewardly opening latch recess 90 which, at its upper edge, is defined by a generally horizontal downwardly-direct facing latch surface or shoulder 99.

In operation, when the press is moved downwardly from the operational position of FIG. 2 into the latching position of FIG. 3, the cam surface 93 on the latch head 91 engages an outer surface of the lower latch part 86 and causes the cantilevered latch member 85 to swing outwardly about the hinge corner 89 in opposition to the urging of the spring 88. As the downward movement of the upper press structure continues, the latch member 85 moves downwardly until the latch head 91 vertically passes downwardly so as to sidewardly align with the latch recess 90. The springs 88 then resiliently urge the latch member 85 to swing inwardly about the hinge 89, whereupon the latch head 91 moves into the latch recess 90 so that the shoulder 94 on the latch head is disposed directly under the shoulder 99 on the latch part 86, thereby creating a connection between the upper and lower press structures to resist forces which tend to effect separation therebetween.

As to the right latch units 84, they are structurally and functionally substantial identical to the left latch units 83, except that the positional relationships are reversed. That is, each right latch unit 84 includes a vertically elongate latch member 85' which has its lower end secured to the edge of the bottom support platen 34 by a pin and spring arrangement, with this latch member 85' being cantilevered upwardly for latching engagement with a latch part 86' which is fixed to the edge of the top press plate assembly 44. The structure and function of the latch parts 85'–86' are thus identical to the latch parts 85–86 except that they are reversely vertically mounted relative to the upper and lower press parts so as to prevent interference with the sideward swinging of the upper press plate assembly into the access position illustrated by FIG. 1.

The press also includes a latch release unit 95 associated with each of the latch units 83–84. The latch release unit 95, for example as associated with each left latch unit 83, includes an actuator formed as a small fluid cylinder, such as an air cylinder 96 which is fixedly mounted on the bottom support platen 34 (or on the upper press plate assembly 44 in the case of the right latch unit 84) directly adjacent the respective latch part 86 (or 86'). The air cylinder 96 has a piston rod 97 which projects outwardly toward and through an opening in the respective latch part 86, which piston rod 97 in the projecting portion thereof is provided with an annular recess 98 which extends between a pair of axially spaced shoulders 101 and 102 formed on the projecting piston rod. The projecting piston rod portion 97 cooperates with the respective latch head 91 (or 91'), the latter having an elongate slot 103 which is formed vertically therein and opens upwardly from the free edge thereof for accommodating the reduced rod portion defined by the surrounding annular recess 98. When the latch head 91 moves vertically so as to seek a latching engagement with the respective latch part 86, the piston rod 97 is in an extended position and passes vertically into the slot 103. When the latch head 91 is resiliently moved into the latch recess associated with the respective latch part 86, the piston rod 97 is retracted into the air cylinder due to the latch head pushing against the inner shoulder 102. When release of the latch is desired, the air cylinder 96 is energized so as to drive the piston rod outwardly, whereupon the shoulder 102 drifts against the latch head 91 and displaces the latch head sidewardly out of the recess in opposition to the urging of the latch spring 88. Also, the cylinder 96 can be energized to pull the rod 97 inwardly to positively lock the latch. The cylinder 96 will then hold the latch head 91 in this sidewardly engaged position until the latch member 85 (or 85') is displaced sidewardly away from the respective latch part 86 (or 86').

The operation of the rim press 25 will now be briefly described.

Starting with the press in the open position illustrated in FIG. 1, the upper press structure 26 is in its uppermost position whereby the upper support platen 46 is in its upper vertical position, and the upper press plate assembly 44 carried thereon is tilted sidewardly so that it angles sidewardly and downwardly, such at an angle of at least 40° relative to the horizontal. In this position, the upper mold part 31 can be readily accessed by a worker standing adjacent the side of the opened press so as to facilitate access not only to this upper mold part 31, but also to the lower mold part 32. In this position, the tilt control spring unit 56 is generally in its shortest or fully contracted condition.

After the operator has performed the necessary operational functions on the upper and lower mold parts, and after the desired quantity of polyurethane has been poured or injected into the lower mold part 32, then the drive arrangement 72 is energized so as to activate the screw drive units 71 to thereby move the upper press structure 26 downwardly toward the closed position.

During the initial closing movement of the upper press structure, the latter is initially moved downwardly from the open position of FIG. 1 into the intermediate operational position of FIG. 2. During this downward movement between the open and operational positions, the extendible spring unit 56 exerts an upward force at the lower hinge 59, simultaneous with the exertion of a downward force at the main support hinge 51 due to the downward driving of the ball nuts 74 and top support platen 41 by the rotation of the screw shafts 73. This hence causes the upper press plate assembly 44 to be swung sidewardly in a counterclockwise direction about the hinge 51 until the rear upper edge 67 of the assembly 44 contacts the stops 68, thereby effecting a horizontal positioning of the upper press plate assembly 44 upon reaching the intermediate operational position illustrated by FIG. 2. During this swinging of the plate assembly between the positions of FIGS. 1 and 2, the spring 56 remains substantially fully contracted.

As the upper press structure 26 continues to be driven downwardly in the closing direction away from the intermediate operational position of FIG. 2, the upper and lower mold parts 31–32 are now vertically aligned so that the upper mold part 31 is moved vertically downwardly so as to be brought into a closing engaged relationship with the lower mold part 32 as illustrated by FIG. 3. Upon reaching a substantially fully closed position, the right and left latch units 83 and 84 engage so that the upper and lower press structures are vertically latched together to resist subsequent imposed press separation forces. Upon reaching this latched position, the main drive motors 75 are de-energized, such as by appropriate limit switches or similar such sensors (not shown).

During the downward closing movement of the upper press structure 26 from the intermediate operational position of FIG. 2 to the closed position of FIG. 3, the spring unit 56 is longitudinally extended, and the piston rod 62 acting on the lower hinge 59 exerts a substantially constant upward force on the upper press plate assembly 44, and hence on the upper support platen 44, whereby the force of the extendible spring unit 56 thus opposes the downward driving force imposed on the ball nuts and thus tends to counterbalance at least a portion of the weight of the upper press structure to thus facilitate and optimize sizing of the drive motors with respect to torque and speed thereof. During the extension of the spring unit 56, some of the pressurized air in the pressure chamber 64 is forced into the pressure accumulator 65 which, in a conventional manner, permits the pressure of the air to remain relatively constant so that a relatively uniform upward biasing force is always created at the spring unit.

After the mold has been closed and latched as illustrated in FIGS. 3–4, then the force applying device 36 of the bottom press structure 27 is appropriately energized or inflated so as to exert an upwardly directed closing force on the lower press plate 35 and hence on the lower mold part 32, causing the latter to be maintained in secured closed engagement with the upper mold part 31. This force applying device 36, and the small permissible vertical movement of the bottom press plate 35, also permits limited upward displacement of the lower mold part 32, if necessary, to ensure proper closure between the upper and lower mold parts. The pressurized air for inflating the air hoses 36 can be supplied from an external pressure force disposed at the particular working station, which pressure source can be releasably coupled to a supply valve for the air hose to provide for appropriate inflation and deflation thereof as desired. Alternately, since the quantity of air required for the air hoses 36 is small, the press carrier 11 can be provided with its own self-contained source of pressurized air if desired.

The mold will be maintained in the closed and locked position, as described above, for a sufficient period of time to permit proper forming of the part, following which the press will be opened to permit removal of the formed part and initiation of a new forming cycle. The opening of the press and specifically the opening movement of the upper press structure 26 is generally the reverse of the movements described above.

More specifically, when opening of the press is desired, the air bags or hoses 36 are de-energized (i.e. deflated) to relieve the mold closure force. The latching devices 95 and specifically the air cylinders 96 thereof are energized so as to drive the latch heads 91 sidewardly so as to effect release thereof from the respective latch parts 86. The drive motors 76 are reversely energized so as to effect upward driving of the upper press structure back to the open position of FIG. 1. When the drive screws 73 are initially rotated so as to effect upward lifting of the upper press structure, however, the extended spring unit 56 is already applying an upwardly directed force on the upper press structure, which force now acts in conjunction with the upward driving force created by the ball-screw drive units so that there thus exists, at the initial opening of the mold, an increased force acting upwardly to effect separation of the mold parts. This thus facilitates the initial cracking or opening of the mold since such initial cracking of the mold is typically the greatest resistance encountered during the opening operation.

With the improved press of this invention as briefly summarized above, the primary movement of the upper press structure in the opening and closing directions is thus controlled by electric motors acting through ball-screw drive shaft arrangements so that the press operations can be effected rapidly and efficiently with minimum heat and noise generation, and without requiring use of hydraulic cylinders or the like. Further, additional force generating requirements are provided preferably by pneumatic devices such as inflatable bladders or cylinders which require utilization of minimal pressurized air, and without creating the operational disadvantages typically associated with hydraulic cylinders and the like.

In addition, in the improved press of the present invention and specifically its provision on a self-propelled carrier which is rollingly supported on and suspended from an overhead track, and particularly the provision of several such press carriers suspended from an overhead support tack arrangement which defines a closed loop and which cooperates with several working stations therealong, the press carrier of this invention can be efficiently moved from station to station so as to not only provide for more convenient and efficient utilization of workers, but also provide for overall efficiency of forming parts. For example, one station can be provided for removing the part and cleaning the tool, which station may also be used for applying the release agent, or in the alternative, the release agent may be applied at a subsequent station. The inserts may be loaded into the mold in one or two subsequent stations, either manually or automatically, depending upon the complexity of the mold and the part being formed. The urethane is then deposited in the mold. With the mold is a closed position, the mold can be moved either into a holding zone or can be slowly moved along a transfer area of the path so as to provide sufficient time for curing, following which the press carrier is recirculated back to a work station whereby the part is removed, with the mold either at the workstation or at the following workstation then being prepared for the next molding cycle.

While the tilt control linkage in the illustrated embodiment utilizes an extendible spring defined by a pneumatic device, it will be appreciated that the extendible spring unit of the invention can utilize mechanical springs (such as coil springs or similar mechanical devices) associated with an extendible link so as to function generally in the same manner as described herein, although the use of mechanical springs will typically result in greater force variation during the extending and contracting movement.

Further, it will further be recognized that the tilt control linkage could be free of springs if desired and still function in the same manner to control tilting of the upper pressure plate assembly between the access and intermediate operational positions illustrated in FIGS. 1 and 2, although such mechanism would obviously be unable to provide any assistance with respect to imposing an upward lifting force on the upper press assembly when the latter is displaced downwardly from the intermediate operational position.

The basic overhead carrier system which is used in conjunction with the improved press carrier of this invention is itself known. One example of an overhead carrier system, known as the "Smart Track" system, is manufactured and sold by the Assignee hereof.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a rim press for permitting molding of an element between upper and lower mold parts which when closed cooperate to define a mold cavity therebetween, said press including a frame, an upper platen arrangement mounted on the press and defining thereon a generally horizontally enlarged and downwardly facing press surface on which the upper mold part is mounted, a lower platen arrangement defining thereon a generally horizontally enlarged and upwardly facing press surface for mounting the lower mold part thereon, at least one of said upper and lower platen arrangements being movably supported on said frame for vertical movement toward and away from the other platen arrangement so that the mold parts can be respectively moved into closed and open positions, and a drive arrangement connected to said one platen arrangement for effecting driving movement thereof between said open and closed positions, comprising the improvement wherein said one platen arrangement is defined by said upper platen arrangement, said upper platen arrangement including an upper platen structure which is vertically guidably supported on said frame for vertical movement between said open and closed position, said upper platen arrangement also including an upper booking plate which defines thereon the downwardly facing press surface on which the upper mold part is mounted, said upper booking plate being swingably mounted on and carried by said upper platen structure so that said upper booking plate can be vertically swingably moved relative to said upper platen structure between a use position wherein the upper booking plate is disposed directly under the upper platen structure so as to be vertically aligned above the lower platen arrangement and an access position wherein the upper booking plate is at least partially vertically oriented so that the downwardly facing press surface thereon is oriented toward one side of the press, said drive arrangement including a screw shaft unit having a vertically elongated screw shaft which is rotatably supported on the frame and a ball-nut unit which surrounds and is rotatably engaged with the screw shaft, said ball nut unit being mounted on and carried by the upper platen structure for displacing the latter vertically in response to rotation of the screw shaft, the drive arrangement also including an electric drive motor which is drivingly interconnected to said screw shaft for effecting rotation thereof in either rotational direction, and a tilt control linkage including first and second telescopingly engaged and coaxially oriented link parts which telescopingly extend and contract relative to one another, said first link part being pivotally connected to said frame and said second link part being pivotally connected to said upper booking plate for causing said upper booking plate to automatically swing between said use and access positions in response to vertical movement of said upper platen structure between said open position and an intermediate operational position which is defined vertically between said open and closed positions.

2. A press according to claim 1, wherein said first and second link parts remain in a substantially fully contracted condition so as to have a minimum length as said upper platen structure is moved vertically between said open and intermediate operational positions whereby said tilt control linkage reacts with said upper booking plate to effect swinging thereof between said access and use positions.

3. A press according to claim 2, wherein said upper booking plate is joined to said upper platen structure by a hinge structure which defines a generally horizontally extending hinge axis which is disposed generally centrally between opposite sides of the upper booking plate, and wherein a lower end of said second link part is pivotally connected to the upper booking plate about a pivot axis which extends generally parallel with but is sidewardly displaced from said hinge axis.

4. A press according to claim 3, wherein said upper booking plate has a stop structure mounted thereon adjacent one side thereof and positioned for engagement with an opposed stop on the upper platen structure when the upper booking plate is in said use position, and said pivot axis being disposed sidewardly between said stop and said hinge axis.

5. A press according to claim 3, wherein said tilt control linkage continually imposes an upwardly directed force on said upper booking plate whenever said upper platen arrangement is displaced downwardly from said intermediate operational position.

6. A press according to claim 1, wherein said tilt control linkage continually imposes an upwardly directed force on said upper booking plate whenever said upper platen arrangement is displaced downwardly from said intermediate operational position.

7. A press according to claim 1, wherein said lower platen arrangement includes a lower platen structure which is fixedly related to said frame and a lower booking plate which is supported on said lower platen structure and defines said upwardly facing press surface for mounting the lower mold part thereon, said lower booking plate being supported on said lower platen structure for limited vertical movement therebetween, and an inflatable air bladder structure cooperating between said bottom platen structure and said bottom booking plate for imposing an upwardly directed mold closing force on the lower mold part when the upper mold part has been moved into said closed position.

8. A press according to claim 7, wherein said tilt control linkage continually imposes an upwardly directed force on said upper booking plate whenever said upper platen arrangement is displaced downwardly from said intermediate operational position.

9. A press according to claim 7, including releasable latch structures provided on said upper and lower platen arrangements and engaging one another when said upper and lower platen arrangements are in said closed position for effecting vertical latching of said platen arrangements together so as to resist the vertical mold closure force generated by the bladder structure.

10. A press according to claim 9, wherein the latch structures include a plurality of cooperating latches which are disposed adjacent sides of the press for holding the mold parts in the closed position, each said cooperating latch including a first latch part which is fixed adjacent a side of one of the upper and lower platen arrangements and a second latch part which is mounted adjacent a side of the other of the upper and lower platen arrangements, said second latch part being vertically elongate and cantilevered from said other platen arrangement for engagement with said first latch part.

11. A press according to claim 10, wherein one of said latches as provided adjacent one side of the press has the first latch part fixedly related directly to the lower platen structure and has the second latch part mounted directly to the upper booking plate adjacent a side edge thereof so as to be cantilevered downwardly therefrom, said second latch part being mounted for limited transverse displacement relative to the upper booking plate to permit the second latch part to movingly latchingly engage and disengage the first latch part, and a latch release device mounted on the lower platen structure adjacent said first latch part for effecting release of said latch.

12. A press according to claim 1 wherein said tilt control linkage comprises a self-contained, closed cylinder assembly, one of said first and second links comprising a cylinder housing and the other said first and second link comprising a piston rod mounting a piston at one end thereof which is slidingly disposed within an interior of said cylinder housing so as to divide said interior into first and second chambers, said cylinder assembly being adapted to continually maintain a substantially uniform pressure within one of said first and second chambers such that said cylinder assembly continually imposes a force on said upper booking plate which is opposite to a driving force of said screw shaft as applied to said ball nut unit during closing of the press.

13. A press according to claim 1 wherein said tilt control linkage continually imposes a force on said upper booking plate which is opposite in direction to a driving force of said screw shaft as applied to said ball nut unit during closing of the press, said force provided by said tilt control linkage cooperating with, and being oriented in the same direction as, a driving force of said screw shaft as applied to said ball nut unit during opening of the press to facilitate initial cracking of the mold parts.

\* \* \* \* \*